(12) United States Patent
Kolhe et al.

(10) Patent No.: US 12,254,416 B2
(45) Date of Patent: Mar. 18, 2025

(54) COMPILER FOR IMPLEMENTING NEURAL NETWORK ACCELERATOR

(71) Applicant: Hewlett Packard Enterprise Development LP, Houston, TX (US)

(72) Inventors: Jitendra Onkar Kolhe, Karnataka (IN); Soumitra Chatterjee, Karnataka (IN); Vaithyalingam Nagendran, Karnataka (IN); Shounak Bandopadhyay, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 935 days.

(21) Appl. No.: 17/229,497

(22) Filed: Apr. 13, 2021

(65) Prior Publication Data

US 2022/0121959 A1    Apr. 21, 2022

(30) Foreign Application Priority Data

Oct. 19, 2020    (IN) .............................. 202041045388

(51) Int. Cl.
   *G06F 9/44*      (2018.01)
   *G06N 3/063*     (2023.01)
   *G06N 3/10*      (2006.01)

(52) U.S. Cl.
   CPC ............... *G06N 3/10* (2013.01); *G06N 3/063* (2013.01)

(58) Field of Classification Search
   CPC ....................................................... G06N 3/10
   USPC ......................................................... 717/159
   See application file for complete search history.

(56) References Cited

U.S. PATENT DOCUMENTS

| | | | |
|---|---|---|---|
| 10,216,704 B1 | 2/2019 | Lu et al. | |
| 10,338,925 B2 | 7/2019 | Fowers et al. | |
| 10,372,787 B2 | 8/2019 | Park et al. | |
| 2019/0042251 A1 | 2/2019 | Nurvitadhi et al. | |
| 2020/0082264 A1 | 3/2020 | Guo et al. | |
| 2020/0110984 A1 | 4/2020 | Chatterjee et al. | |
| 2021/0192314 A1* | 6/2021 | Aarts ..................... | G06N 3/044 |
| 2024/0168913 A1* | 5/2024 | Nama ................. | G06F 15/7885 |

OTHER PUBLICATIONS

Ankit et al., "PUMA: A Programmable Ultra-efficient Memristor-based Accelerator for Machine Learning Inference", ACM, Apr. 13-17, 2019, 17 pages.
Bernal et al., "Deep Convolutional Neural Networks for Brain Image Analysis on Magnetic Resonance Imaging: a Review", Jun. 11, 2018, 27 pages.

(Continued)

*Primary Examiner* — Evral E Bodden
(74) *Attorney, Agent, or Firm* — Yao Legal Services, Inc.

(57) ABSTRACT

Examples disclosed herein relate to using a compiler for implementing tensor operations in a neural network base computing system. A compiler defines the tensor operations to be implemented. The compiler identifies a binary tensor operation receiving input operands from a first output tensor of a first tensor operation and a second output tensor of a second tensor operation from two different paths of the convolution neural network. For the binary tensor operation, the compiler allocates a buffer space for a first input operand in the binary tensor operation based on a difference between a count of instances of the first output tensor and a count of instances of the second output tensor.

20 Claims, 6 Drawing Sheets

(56) References Cited

OTHER PUBLICATIONS

Drebes, Andi, "Dynamic Optimization of Data-Flow Task-Parallel Applications for Large-Scale NUMA Systems", HAL, Jan. 19, 2016, 308 pages.

Feng, Vincent, "An Overview of ResNet and its Variants", available online at <https://towardsdatascience.com/an-overview-of-resnet-and-its-variants-5281e2f56035>, Jul. 16, 2017, 15 pages.

Hu et al., "Dot-Product Engine for Neuromorphic Computing: Programming 1T1M Crossbar to Accelerate Matrix-Vector Multiplication", 2016, 7 pages.

Hu et al., "The Dot-Product Engine: Programming Memristor Crossbar Arrays for Efficient Vector-Matrix Multiplication", in ICCAD workshop on Efficient Computing in the Dark Silicon Era, (Austin), Nov. 2015, 1 page.

Karim, Raimi, "Illustrated: 10 CNN Architectures", Towards Data Science, available online at <https://towardsdatascience.com/illustrated-10-cnn-architectures-95d78ace614d>, Jul. 29, 2019, 24 pages.

Tuma, Miroslav, "Parallel Matrix Computations", Department of Numerical Mathematics, Faculty of Mathematics and Physics Charles University, May 4, 2020, 177 pages.

\* cited by examiner

COMPILER FOR IMPLEMENTING NEURAL NETWORK ACCELERATOR

BACKGROUND

Convolutional neural networks (CNNs) have been used for performing complex recognition tasks such as large-category image classification, automatic speech recognition, as well as other data classification/recognition tasks. A CNN is typically constructed of one of more layers. An operation is performed at each layer. Typically, this operation is a convolution operation or multiplication operation. This operation may further include pooling. CNNs have evolved from handling five convolution layers to fifty convolution layers and support large datasets.

BRIEF DESCRIPTION OF THE DRAWINGS

The following detailed description references the drawings, wherein.

Figure 1:
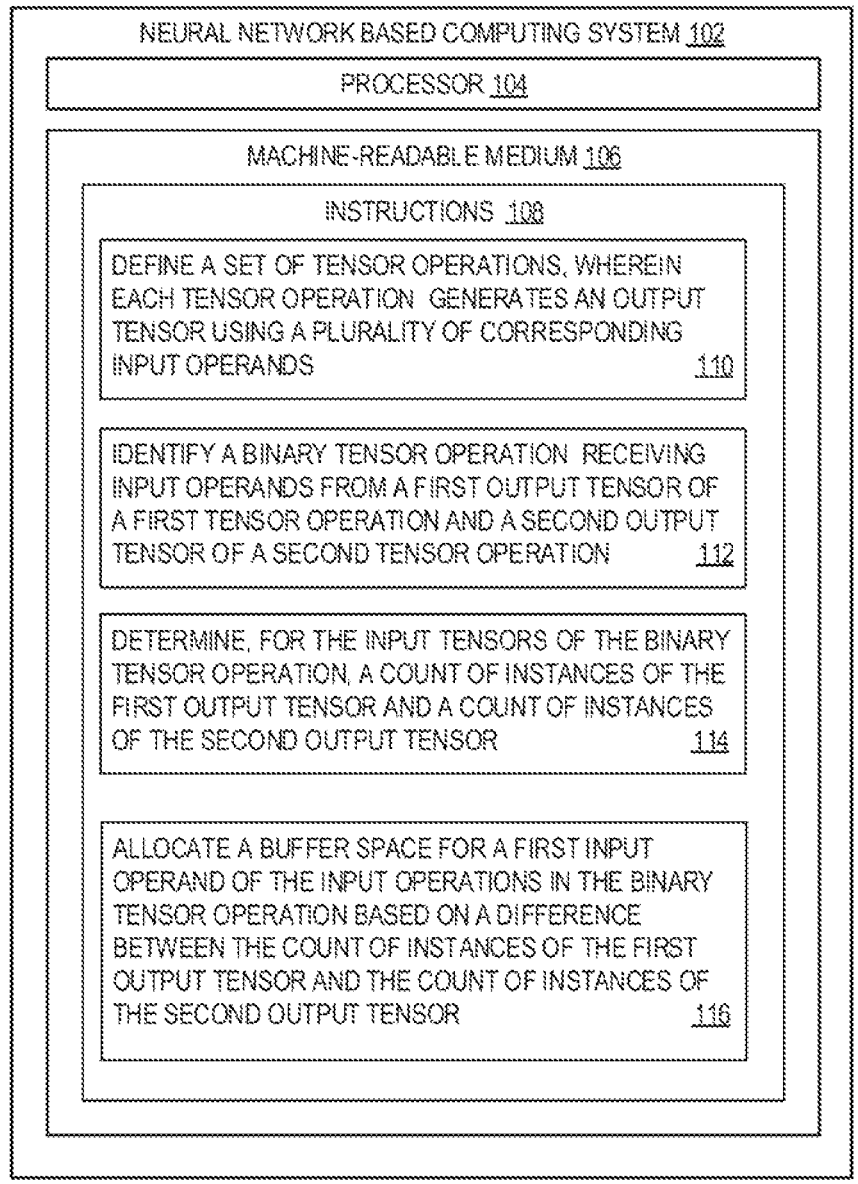
FIG. 1 illustrates an example of operating a processor in a neural network-based computing system.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As used herein, the term "tensor" refers an image data to be processed.

As used herein, the term "tensor operation" any type of operation performed on the tensor in a convolution neural network (CNN) while processing an input image.

As user herein, the term "binary tensor operation" refers to a tensor operation receiving input operands from two different paths of a multipath CNN. The binary tensor operations can include addition operations and concatenation operations.

CNNs are powerful models that can be configured to be veil suited for computer vision problems. An input image is represented as tensor data type and the tensor is split into partitions. Each partition is stored on a constrained memory capacity of a computer unit and tensor operations are then performed on the partitions.

In CNNs with single path architecture there is a single sequential flow of information in the forward direction. Each tensor operation provides an output tensor directly to the next tensor operation. The next tensor operation is dependent on the output tensor from the previous tensor operation to generate its output tensor. The results of the tensor operations across different partitions may then be suitably combined to provide a single output. In CNNs with multipath architecture there may be multiple paths and each path may have tensor operations being performed. The tensor operations in each path may be performed independently and asynchronously across compute units. The multiple paths may converge at a single point to produce a single output.

In multipath CNN, at the point of convergence, a tensor operation may receive output tensors from two different tensor operations from two different paths. Such tensor operations, receive two different pre-defined partitions of tensor generated from two different paths as input operands. These operations may be called as binary tensor operations or convergence operations.

The output tensors from the tensor operations in two different paths are produced asynchronously as the number of tensor operations at each path of the multipath CNN is different. This means that binary tensor operation receives operands at different rates and a faster operand may have to wait for a slower operand. In addition, considering that CNNs are iterative in nature, additional instances of the faster operand are generated before the slower operand is received. If the buffer of the faster operand has allocated space to store a single instance of output tensor, the buffer may get overwritten even before the binary tensor operation is performed resulting in data loss. If the tensor operation of faster operation waits for a read confirmation from the binary operation, the tensor operations dependent on the faster operand may get stalled resulting in a deadlock for the tensor operations in a path.

The problem of data loss and deadlock gets amplified when the multipath CNN is configured to support tensor operations that accept operands from a high number of paths. For example, some compilers supporting tensor operations need to support tensor operations with 32 different paths. The dependency of tensor operations on previous tensor operations and varying number of tensor operations being performed in each path results in generation of asynchronous operands. Hence, before implementing tensor operations on a neural network accelerator, the compiler design should account for the asynchronous operands so that there is no data loss during tensor processing and stalling of operations leading to deadlock is avoided.

Accordingly, various examples disclosed herein relate to a compiler design for implementing tensor operations in a neural network accelerator of a neural network based computing system. The compiler defines the tensor operations to be implemented. Each tensor operation generates an output tensor using multiple input operands. The compiler can identify binary tensor operations in the tensor operations. A binary tensor operation receives input operands from a first output tensor of a first tensor operation and a second output tensor of a second tensor operation. For the binary tensor operation, a count of instances of the first output tensor and a count of instances of the second output tensor is computed. The compiler allocates a buffer space for a first input operand of the input operands in the binary tensor operation based on a difference between the count of instances of the first output tensor and the count of instances of the second output tensor.

FIG. 1 illustrates an example of operating a processor in a neural network-based computing system 102 (referred to as system 102), in accordance with an example of the present subject matter. The system 102 includes a processor 104, and a machine-readable storage medium 106 which is coupled to, and accessible by, the processor 104. The system 102 may be implemented in any computing system, such as a storage array, server, desktop or a laptop computing device, a distributed computing system, or the like. Although not depicted, the system 102 may include other components, such as interfaces to communicate over the network or with external storage or computing devices, display, input/output interfaces, operating systems, applications, data, and the like, which have not been described for brevity.

The processor 104 may be implemented as a dedicated processor, a shared processor, or a plurality of individual processors, some of which may be shared. The machine-readable storage medium 106 may be communicatively connected to the processor 104. In an example, the processor 104 may include a neural network compiler. Among other capabilities, the processor 104 may fetch and execute computer-readable instructions, including instructions 108, stored in the machine-readable storage medium 106. The machine-readable storage medium 106 may include any non-transitory computer-readable medium including, for example, volatile memory such as RAM, or non-volatile memory such as EPROM, flash memory, and the like. The instructions 108 may be executed for operating a processor of the system 102. The processor 104 configures a neural network accelerator to perform tensor operations.

The neural network accelerator includes a hierarchical architecture across which various computational units of the neural network-based computing systems may be present.

The neural network accelerator may include memristive crossbar arrays which form a core. A collection of cores form a the unit, with multiple such tile units forming a clump unit. Each of the cores and the tile units may further include respective memory units. The clump unit, tile unit, cores and respective memory units represent the hierarchy of computational units in the neural network accelerator.

The neural network accelerator may be implemented in a field programmable gate array (FPGA), application specific circuit (ASIC), application specific standard product (ASSP), system on a chip (SoC), complex programmable logic device (CPLD), but is not limited thereto.

In an example, the processor 104 may fetch and execute instructions 108. For example, as a result of the execution of the instructions 110, a plurality of tensor operations associated with a multipath CNN may be defined. The processor 104 receives programmable instructions for implementing tensor operations and generates a machine-level code using the programmable instructions. Such programmable instructions may pertain to a neural network application expressed using a domain specific language (DSL), as per an example. The DSL may be used for defining plurality tensor operations that are to be implemented in a multipath CNN architecture. Each tensor operation may have plurality of operands and generates a single output tensor.

Once the tensor operations to be implemented are defined, binary operations may be identified. In an example, instructions 112 may be executed to identify binary tensor operations in the plurality of tensor operations. The binary tensor operations receive input operands from two different tensor operations. In addition, the input operands are received from two different paths of the multipath CNN. The input operands for the binary tensor operation includes a first output tensor from a first tensor operation and a second output tensor from a second tensor operation. The present example is explained with respect to a single binary tensor operation receiving input operands from a first tensor operation and a second tensor operation. However, such approaches may be performed for binary tensor operation receiving multiple input operands from multiple tensor operations without deviating from the scope of the present subject matter.

With the binary tensor operation identified, instructions 114 may be executed to determine a count of instances of the first output tensor and the count of instances of the second output tensor. The count of instances of the first output tensor and the count of instances of the second output tensor indicate the number of times the first output tensor and second output tensor are generated prior to the first iteration of the binary tensor operation. The processor 104 is configured to maintain the count of instances for input operands and output tensor for each tensor operation being implemented in the neural network accelerator.

With the count of instances of the first output tensor and second output tensor at the binary tensor operation, the instructions 116 may be executed to allocate a buffer space for a first input operand of the input operands in the binary tensor operation based on a difference between the count of instances of the first output tensor and the count of instances of the second output tensor. The binary tensor operation can be performed when both the operands are available, i.e. the first output tensor and second output tensor. When the first output tensor is produced at higher rate in comparison to the second output tensor, the instances of the first output tensor may be stored until the first instance of the second output tensor is available at the binary tensor operation. The processor 104 is configured to allocate memory space for the instances of the first output tensor. The size of the memory space is based on a difference between the count of instances of the first output tensor and the count of instances of the second output tensor.

The above functionalities performed as a result of the execution of the instructions 108 may be performed by the compiler (processor 104 of the neural network-based computing system 102. The compiler of the neural network-based computing system (referred to as a neural network compiler) may be called at runtime during the execution of programmable instructions implementing tensor operations. These and other examples are further described with respect to other figures.

Figure 2:
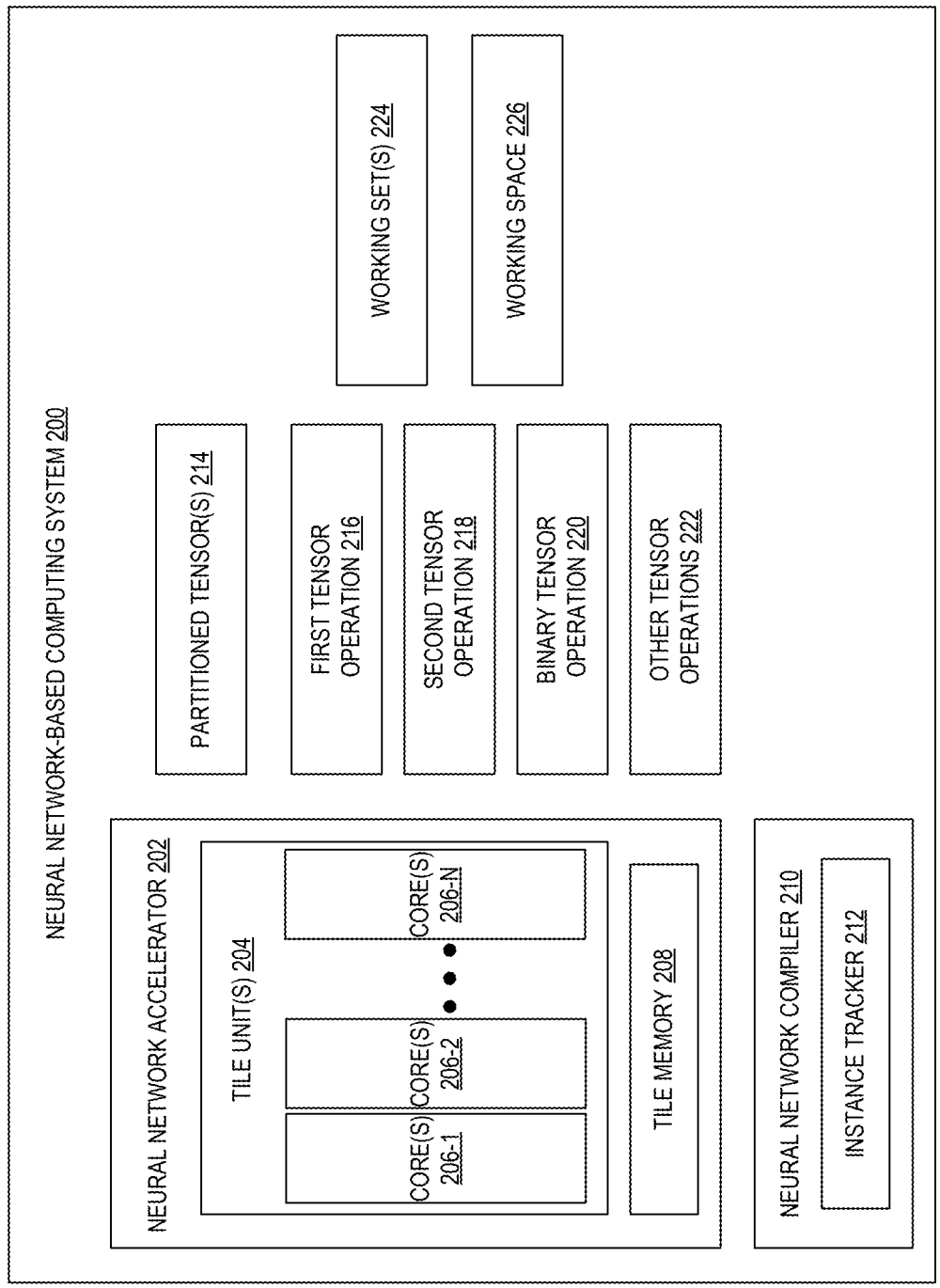
FIG. 2 is a block diagram of a neural computing network-based computing system, according to an example of the present disclosure.

FIG. 2 is a block diagram of a neural computing network-based computing system, according to an example of the present disclosure. The neural network-based computing system 200 (referred to as system 200) supports a CNN with a plurality of convolution layers in the form of computational units arranged in a hierarchical manner. In an example, the neural network accelerator 202 implements a multipath CNN architecture. Each layer is associated with a tensor operation. In an example, the system 200 may further include the unit(s) 204 which include a plurality of core(s) 206-1, 2 . . . N. The tile unit(s) 204 may further include a the memory 208. The tile memory 208 may be either a volatile memory (e.g., RAM), and/or non-volatile memory (e.g., EPROM, flash memory, memristor, etc.). The tile memory 208 may alternately be coupled to an external memory unit, such as a flash drive, an external hard disk drive, or the like. It may be noted that although the present figure illustrates a single tile unit(s) 204, the system 200 may include a plurality of such similar tile unit(s) 204 without deviating from the scope of the present subject matter.

The system 200 may also include certain functional elements, in an example, the system 200 may include a neural network compiler 210 (referred to as compiler 210). The compiler 210 compiles, i.e., generates a machine-level executable code based on a programmable instruction provided for implementing tensor operations. Such programmable instructions may pertain to a neural network application expressed using a domain specific language (DSL), as per an example. In such instances, the DSL may be used for defining plurality of tensors, and various tensor operations that are to be implemented. In an example, a DSL compiler may be used for defining tensor operations in a multipath CNN.

In operation, the programmable instructions in DSL may be compiled by the compiler 210 at runtime. The compiler 210 may thereafter generate an executable or corresponding machine-level executable code. Once the machine-level code is generated, the same may be executed on the neural network accelerator 202. It may be noted that during compile time, the manner in which the various tensor operations are to be performed are configured within the generated machine-level executable code. The machine-level executable code, when executed by a neural network accelerator 202, implements the various functionalities, as further described. The system 200 may implement a variety of tensor operations for processing digital data which is represented in the form of tensors. As explained previously, a tensor may be any N-dimensional data structure representing certain digital data. For example, a colored image having certain pixels may be represented as a 3-dimensional tensor with two dimensions representative of information corresponding to the longitudinally and vertically arranged pixel, with another dimension providing for channel (e.g., R, G, or B related information) corresponding to each pixel. It may be noted that higher dimensioned tensors which may pertain to image or any other forms of digital data are also possible. Such examples would a fail within the scope of the present subject matter.

A tensor that is representative of a digital data may be initially received as input by the system 200. At runtime, the received tensor may be processed to generate a plurality of partitioned tensor(s) 214. In an example, the partitioning of tensors may be performed across specific dimensions of the tensor under consideration. For example, the tensor representing 6*6 pixeled image and three channels, has dimensions corresponding to the 6-pixel rows, the 6-pixel columns and the 3 channels. In the context of the present example, the compiler 210 may partition the tensor along a channel boundary to provide 36 such partitioned tensor(s) 214. It may be noted that the partitioning of the tensor may be performed across any dimension to generate the partitioned tensor(s) 214.

Once the partitioned tensor(s) 214 are generated, the compiler 210 may process the same and provide working set. In an example, the working set may be stored in the system 200 as working set(s) 224. The working set(s) 224 is the set of partitioned tensor(s) 214 which are allocated storage in the tile memory 208. Continuing with the example discussed previously, the compiler 210 processes the 36 partitioned tensor(s) 214 to generate a working set(s) 224. In an example, the compiler 210 may generate a working set(s) 224 corresponding to, say a given row of the tensor. In such a case, an input tensor having 6*6*3 dimensions may be processed by the compiler 210 to provide 6 working sets having 6 partitioned tensor(s) 214, with each partitioned tensor(s) 214 having 3 elements. The way the dimension is selected about which the working set(s) 224 is generated may differ, without deviating from the scope of the present subject matter.

With the working set(s) 224 determined, the tensor operations which are to be performed on the partitioned tensor(s) 214 may be determined. The compiler 210 may determine the various partitioned tensors 214 to be used in tensor operations, which are then configured to be performed, upon execution of the machine-level executable code. In an example, the various tensor operations pertain to the multipath CNN. Examples of such tensor operations include, but are not limited, convolution operation, pooling operation, and padding operation. For the purposes of the present description, the system 200 may include a first tensor operation 216, a second tensor operation 218 and a binary tensor operation 220. The system 200 may further include other tensor operation(s) 222. The approaches as described herein, are applicable for such tensor operations without any limitation. The first tensor operation 216, the second tensor operation 218, the binary tensor operation 220 and the other operation(s) 222 may be allocated to specific core(s) 206 within the tile unit(s) 204 in the tile memory 208.

In an example, the overall tensor operation that is to be performed on an input tensor may be defined by way of a compute graph. A compute graph may be considered as a logical representation defining various nodes. Each of the nodes of the compute graph may represent a tensor operation that is to be performed. The compute graph may further include edges representing the operand converging onto a node. The operation defined through node, is applied onto the input operands to provide an output tensor which may be represented as an outgoing edge emanating from the node. Each compute graph may be configured to implement 0-N tensor operations. The compute graphs may be divided into subgraphs. Each subgraph may implement 0-M tensor operations. Each compute subgraph implements the 0-M operations in a single path. For example, in FIG. 5, the labels subgraph-1 and subgraph-2 represent two different paths originating after the first tensor operation. The sub graph-1 has zero tensor operations and the subgraph-2 has two tensor operations.

The compiler 210 may define a working space 226 for each tensor operation, such as the first tensor operation 216, the second tensor operation 218, the binary tensor operation 220 or the other operation(s) 222. The working space 226 is defined for each within the tile memory 208. In an example, the size of memory space allocated to the working set(s) 224 may be dependent on a predefined number of working sets (s) 224 which may be processed for the entire tensor operation to be completed. The working space 226 receives the input operands from the working set(s) 224 for each iteration of a tensor operation. Based on the received input operands each tensor operation is performed and the output of the tensor operation is generated. The output of a tensor operation may then be provided to a subsequent operation which processes it as an input. The tensor operations in the compute graph may execute iteratively for different workings set(s) 224 to provide multiple outputs. The tensor operations may be allocated to the different core(s) 206. In an example, the first tensor operation 216 may be allocated to the core(s) 206-1, while the second tensor operation 218 may be allocated to the core(s) 206-2, within the tile unit(s) 204. The allocation of the first tensor operation 216, the second tensor operation 218 and the binary tensor operation 220 to different core(s) 206 enables the first tensor operation 216, the second tensor operation 218 and the binary tensor operation 220 to be performed independent from each other.

Using the working space 226 allocated to each tensor operation, the neural network accelerator 202 may execute the tensors operations for a neural network application. At runtime, for each tensor operation in the compute graph, corresponding working set(s) are provided to corresponding working space(s) 226 and the corresponding output tensors are generated. The generated output tensors are the working space(s) 226 within the tile memory 208.

Once a first instance of a first tensor output is generated by the first tensor operation 216 and the first tensor output is retrieved and used as an input operand by the subsequent tensor operation, the first tensor operation 216 may loop back and request for a subsequent working set, e.g., from the working set(s) 224. Once a fresh working set is received, the first tensor operation 216 may process the same to provide a second instance of the first output tensor. It may be noted that the subsequent loop performed by the first tensor operation 216 may be implemented in parallel with the execution of the subsequent tensor operation. The first tensor operation 216, the second tensor operation 218, the binary tensor operation 220 and other tensor operation(s) may work in parallel and generate output tensors. In the example CNN of FIG. 5, the first tensor output O1 of the first tensor operation Op1 is used by the second tensor operation Op2 and Op2 needs three instances of the O1 to perform its first iteration.

The tensor operations may be performed iteratively using different working set(s) 224. Each iteration of tensor operations produces an output tensor instance. The compiler 210 maintains a track of instances of input operands and output tensors for each tensor operation using an instance tracker 212. The instance tracker 212 may be maintained using an array. Based on the number of the instances of input operands and number of output tensors at each tensor operation and the dependency of tensor operation on output tensors of a previous tensor operation in the compute graph, the count of instances of the input operands and the output tensor is maintained at each tensor operation. Based on the count of instances of the input operands and output tensor, appropriate buffer space is allocated for input operands.

The binary tensor operation 220 is a tensor operation receiving input operands from two different tensor operations. The binary tensor operation operates on two different images and is analogous to an addition or concatenation operation. In neural networks implementing multipath CNNs, the two different tensor operations providing input tensors to binary tensor operation may generate output tensors asynchronously. The output tensor are produced at two different rates. In addition, the input operands may be received from two different subgraphs of the compute graph. For example, the binary tensor operation Op4 in FIG. 5 receives input operands from first tensor operation Op1 and the third tensor operation Op3 via the subgraph 1(first path) and subgraph −2(second path). The two paths originate after the Op1 and converge at Op4.

Figure 3:
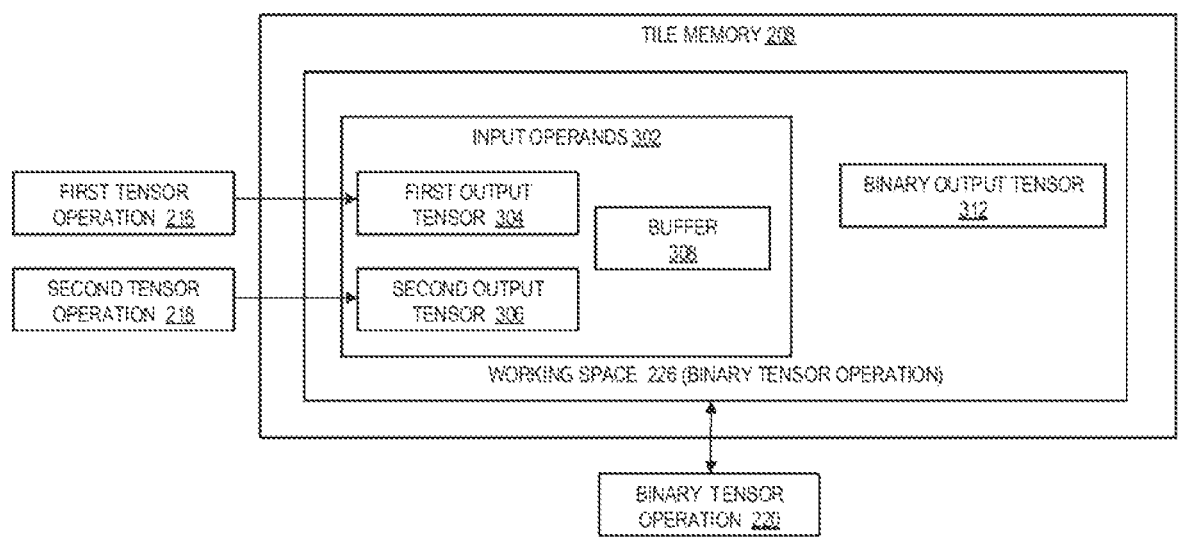
FIG. 3 illustrates a block diagram depicting interaction between various elements associated with binary tensor operation in a tile memory of the neural network-based computing system, according to an example of the present disclosure.

FIG. 3 illustrates a block diagram depicting interaction between various elements associated with binary tensor operation 220 in a tile memory 208 of the neural network-based computing system 200. FIG. 3 depicts the working space 226 of a binary tensor operation 220 within a tile memory 208.

The compiler 210 may allocate a certain portion of the memory of the tile unit(s) 204 as the working space for the binary tensor operation 220. The input operands for the binary tensor operation 220 are received in the working space 226 of the binary tensor operation 220. The binary tensor operation 220 receives input operands 302 from two different tensor operations.

The first input operand 302 is the first output tensor 304 received from the first tensor operation 216 and the second input operand 302 is the second output tensor 306 received from second tensor operation 218. Both the input tensor operands 302 are received from tensor operations executed in two different paths, i.e. the first tensor operation 216 and second tensor operation 218 are part of two different subgraphs of the compute graph. The first output tensor 304 and the second output tensor 306 are produced independently and asynchronously.

Based on the number of tensor operations in each compute graph, the working space of binary tensor operation 220 may receive the input operands 302 at different times. A faster operand may be available at the workspace 226 of the binary tensor operation 220 before the slower operand. Assuming that the first output tensor 304 from the first tensor operation 216 is produced at faster rate and available, the binary tensor operation 220 can be performed when the second output tensor 306 is available. In addition, the first tensor operation 216 may perform multiple iterations leading to multiple instances of the first output tensor 304 until the slower operand is available at the binary tensor operation 220. To avoid data loss, the binary tensor operation 220 may stores the multiple instances of the first output tensor 304 in a buffer 308.

Figure 5:
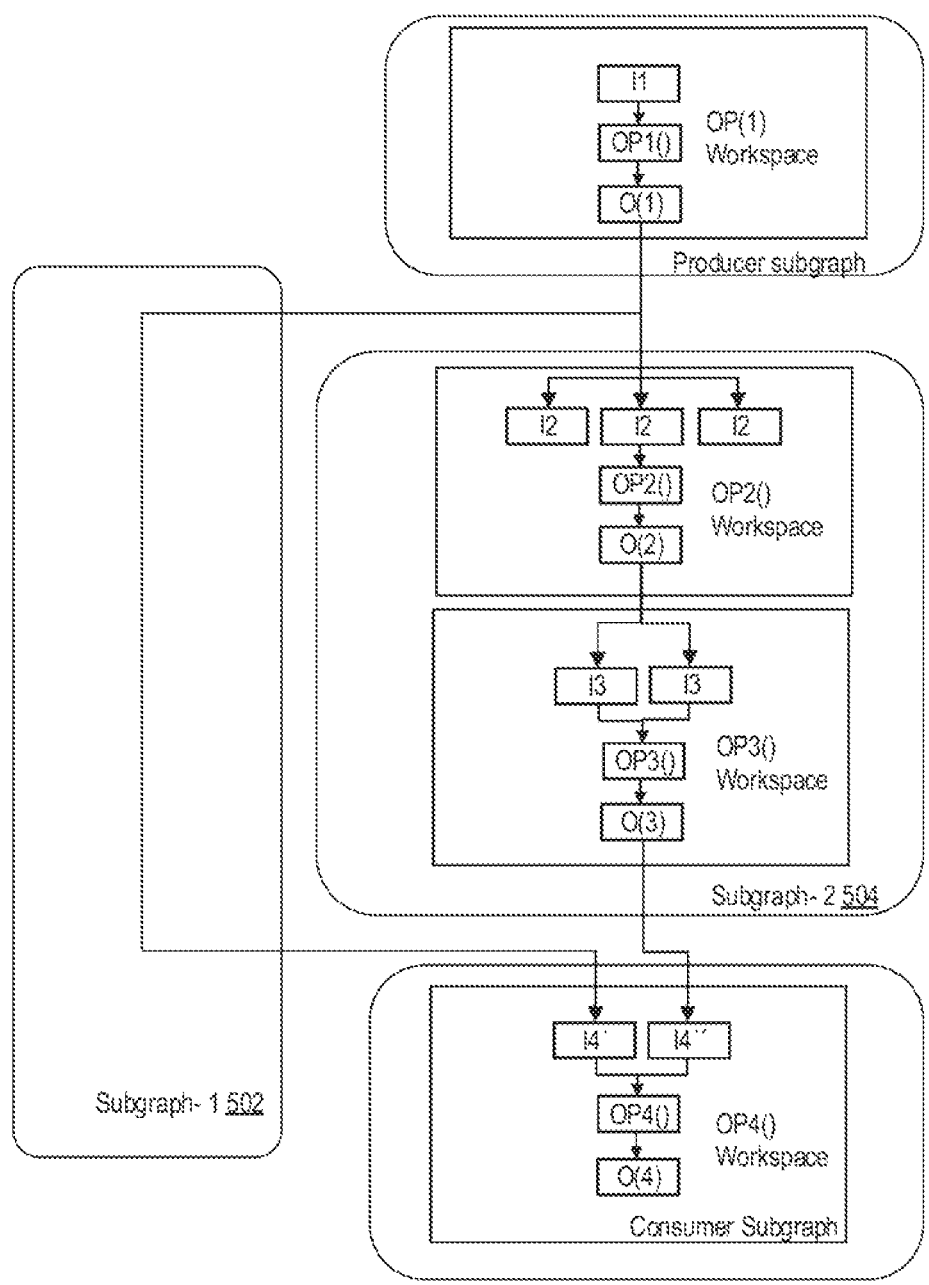
FIG. 5 illustrates an example compute graph displaying flow of information in tensor operations in a multi-path CNN.

Continuing the example of FIG. 5, the binary tensor operation Op4 receives input operands from first tensor operation Op1 and the third tensor operation Op3 via two different paths (defined by the subgraph-1 and subgraph-2). Although the first output tensor O1 is available for processing at the Op4 as soon as the first instance of first output tensor O1 is generated by Op1, Op4 can be performed when the first instance of the third output tensor O3 from Op3 is available. Moreover, as O1 is produced at a faster rate, and additional iterations of Op1 may result in additional instances of the first output tensor O1. The Op4 stores the additional instances of the first output tensor Op1 in a memory space until the first instance of output tensor O3 from Op3 is available.

In an example, the size of buffer 308 is based on a count of instances of the first output tensor 304 generated u the first instance of the second output tensor 306 is received.

Although the FIG. 3 depicts a single buffer 308 for the faster operand (first output tensor 304), it should be understood that the number of buffers 308 can be adjusted based on the number of operands. The method 400 described in FIG. 4 describes how the size of the buffer 308 for the input operands 302 is computed.

Figure 4:
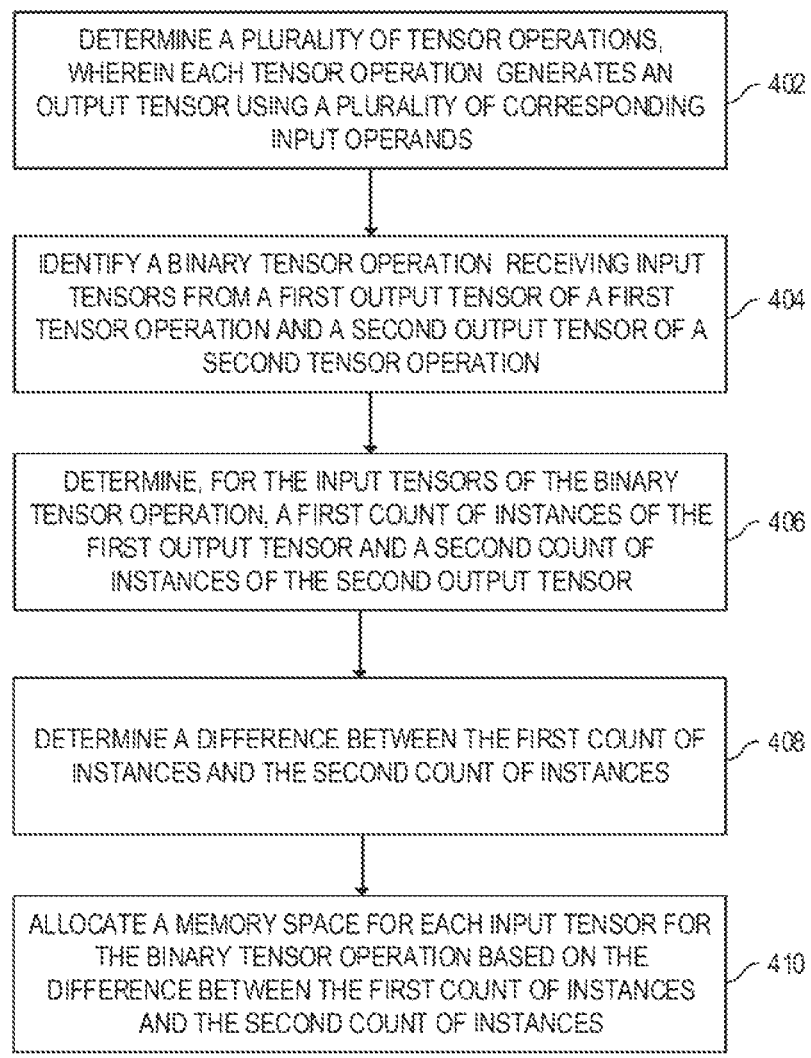
FIG. 4 is a flowchart of a method 400 for implementing tensor operations in a multi-path Convolution Neural Network (CNN)

FIG. 4 is a flowchart of a method 400 for operating a processor in a neural network-based computing system 102 implementing tensor operations in a multipath CNN. The order in which the above-mentioned methods are described is not intended to be construed as a limitation, and some of the described method blocks may be combined in a different order to implement the methods, or alternative methods. Furthermore, the above-mentioned methods may be implemented in any suitable hardware, computer-readable instructions, or combination thereof. The steps of such methods may be performed by either a system under the instruction of machine executable instructions stored on a non-transitory computer readable medium. For example, the methods may be performed by the one of systems 102 or 200. In an implementation, the methods may be in performed under an "as a service" delivery model, where the system 102, 200, operated by a provider, receives programmable code in domain specific language for operating the compiler 210 in a neural network based computing system 200. Herein, some examples are also intended to cover non-transitory computer readable medium, for example, digital data storage media, which are computer readable and encode computer-executable instructions, where said instructions perform some or all the steps of the above-mentioned methods.

At block 402, a plurality of tensor operations associated with a neural network accelerator 202 may be determined. The compiler 210 receives programmable instruction for implementing tensor operations and generates a machine-level code using the programmable instructions. The programmable instructions are expressed using DSL. A DSL compiler may be used for defining tensor operations to be implemented in neural network accelerator 202 using a multi-path CNN architecture. Each tensor operation may have plurality of operands and generates an output tensor. In an example, a tensor operation may be performed using a partitioned tensor 214 of the tensor. For example, in FIG. 5, Op1 tensor operation, in the 1st iteration, operates on a single instance of partitioned tensor image (I1). In another example from FIG. 5, the Op2 tensor operation in FIG. 5 operates on three different instances of its input operand I2, i.e. the Op2 needs three instances of first output tensor O1. The Op2 needs three instances of the partitioned tensor image I1 received as O1 from Op1.

At block 404, the method 400 includes identifying a binary tensor operation 220 in the plurality of tensor operations. Based on the defined tensor operations in compute graph, the compiler 210 can identify a binary tensor operation 220 in from the plurality of tensor operations defined by the compiler 210. The binary tensor operation 220 receives input operands from two different tensor operations. In addition, the input operands may be received from two different subgraphs of the compute graph. The inputs operands 302 for the binary tensor operation 220 includes a first output tensor 304 from a first tensor operation 216 and a second output tensor 306 from a second tensor operation 218. For example, the binary tensor operation Op4 in FIG. 5 receives input operands from first tensor operation Op1 and the third tensor operation Op3 via subgraph-1 and subgraph-2.

At block 406, the compiler 210 determines a count of instances of the first output tensor 304 and the count of instances of the second output tensor 306. The compiler 210 is configured to maintain the count of instances of the input operands and output tensor for the tensor operations being implemented. The compiler 210 retrieves the count of instances from the instance tracker 212. The count of instances of the first output tensor 304 and the count of instances of the second output tensor 306 indicates the number of times the first output tensor 304 and second output tensor 306 are generated prior to the first iteration of the binary tensor operation 220.

At block 408, the compiler computes the difference in the count of instances of the first output tensor 304 of the first tensor operation 216 and the count of instances of the second output tensor 306 of the second tensor operation 218 at the binary tensor operation 220. The binary tensor operation 220 can be performed when both the operands are available, i.e. the first output tensor 304 and second output tensor 306. In system 200 implementing multipath CNN, one of the input operands may be produced and received at higher rate (referred to as faster operand) in comparison to the other input operand (referred to as slower operand). For example, the first output, tensor 304 may be generated at a higher rate in comparison to the second output tensor 306.

When the first output tensor 304 is generated at a higher rate and is received by the binary tensor operation 220, the multiple instances of the faster operand are stored in a buffer space until the slower operand is available at the binary tensor operation 220. To compute the size of the buffer for storing the multiple instances of the faster operand, the difference between the count of instances of the faster operand 304 and slower operand 306 is considered. In addition, each of the input operands 302 may be received via different computing paths (subgraphs of the compute node). In each path the number of tensor operations being performed may be different resulting in receipt of the input operands at the binary tensor operation 220 at different times. The instance tracker 212 of the compiler 210 tracking the instances of input operands and output tensor for all tensor operation in the subgraph is considered while determining the difference between the count of instances of the faster operand 304 and the slower operand 306. The difference in the count of instances indicates the number of instances of faster operand which to be stored at the binary tensor operation 220.

In the example of FIG. 5, the binary tensor operation Op4 receives input operands from first tensor operation Op1 and the third tensor operation Op3 via the subgraph-1 and subgraph-2. The first output tensor O1 is the faster operand and is available for processing at the Op4 as soon as the first instance of first output tensor O1 is generated by Op1 as there are zero operations in the subgraph-1. The Op4 has to wait until the first instance of the third output tensor O3 from Op3 is available. As the O1 is produced at a faster rate, additional iterations of Op1 may result in additional instances of the first output tensor O1. The third output tensor O3 is available at Op4 after the processing of the second tensor operation Op2 and Op3. The instances of the input operands and output tensor of Op2 and Op3 are considered while computing the difference between the count of instances of the Op1 and count of instances of Op3. The difference between the count of instances of the Op1 and the Op3 (considering instances of input operands and output tensor for Op2 and Op3) determines the count of four instances of O1 which are to be stored in the buffer space.

At block 410, the compiler 210 allocates a buffer space for a first input operand of the input operands 302 in the binary tensor operation based on a difference between the count of instances of the first output tensor 304 and the count of instances of the second output tensor 306. The compiler 210 is configured to allocate memory space for the instances of the first output tensor 304. The size of the memory space is based on the count of instances of the first output tensor 304 computed based on the difference between the count of instances of the first output tensor and the count of instances of the second output tensor. The allocation of memory space for input operands based on instance tracking results in optimal utilization of the memory and accelerator resources.

FIG. 5 illustrates an example compute graph displaying flow of information in tensor operations in a multi-path CNN implemented on the neural network accelerator 202 of the neural network-based computing system 200. Referring to FIG. 5, the Op1 tensor operation, in the 1st iteration, operates on a single instance of pre-defined partition of input tensor image (I1), to generate a partition of its output tensor image (O1). The O1 is consumed by 2 independent sub-graphs i.e. subgraph-1 502 and subgraph-2 504. The sub-graphs 502 and 504 have a common point of origin after the Op1. The output tensor of Op1 is passed to multiple operations in different paths. In the path of subgraph-1 502, there are no tensor operations. The output tensor O1 is directly sent to Op4. In the path of subgraph-2 504 has two operations—Op2 and Op3. In subgraph-2 504 the output tensor O1 from Op1 acts as input operand for Op2 tensor operation. The Op2 tensor operation operates on three instances of its input tensor output tensor O1 received from Op1). The subgraph-2 504 includes Op3 tensor operation which operates on two instances of its input tensor (output tensor O2 received from Op2). The Op4 is the paint where the sub-graphs converge. The Op4 may performing an addition or a concatenation operation. As there are zero operations in subgraph 1, first input operand from Op1 is received at Op4 before the second input operand from Op3. The compiler allocates a memory space to store the multiple instances of O1 received at Op4 until the second output tensor O3 from Op3 is available and Op4 can start performing its iterations using the instances from the memory space.

Figure 6:
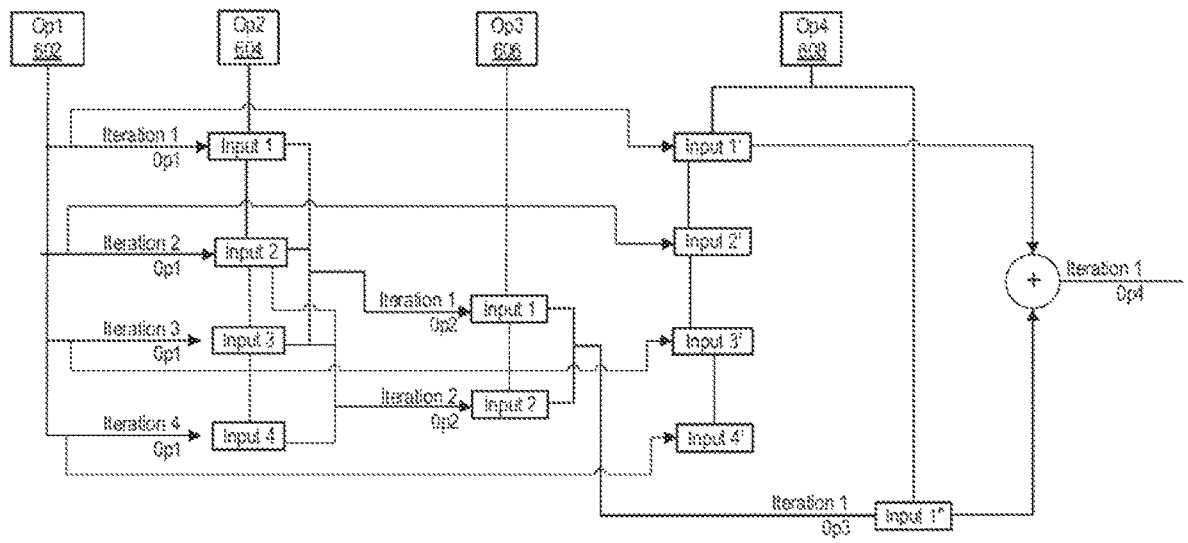
FIG. 6 illustrates a sequence of execution of tensor operations depicted in FIG. 4 after allocation of buffer space, according to an example of the present disclosure.

FIG. 6 illustrates a sequence of execution of tensor operations depicted in FIG. 4 after allocation of buffer space, according to an example of the present disclosure. The FIG. 6 depicts a sequence of operations leading for Op4 to unblock and generate its first instance of its output tensor O4.

Based on the difference in the count of instances of Op1 602 and count of instances of Op3 606, the input operand of Op4 608 has to store four instances of O1 in buffer space and four slots may be allocated in the buffer for every new instance of O1 produced by the first tensor operation Op1. In FIG. 6, the input 1', input 2', input 3' and input 4' represent the four instances of O1 stored at the buffer of Op4 608. Every instance of output tenor O1 is read from the work-space of Opt 602 and gets copied to four slots of I4'. At the same time, Op2 604 tensor operation reads output O1 from the three iterations of Op1 602 operation. When three instances of output tensor O1 are copied to I2, Op2 604 can generate its first instance of output tensor O2. Op3 606 gets unblocked to read the first instance of O2 and is copied into I3. In the meantime, the first tensor operation Op1 602 is free to produce a fourth instance of O1. With the fourth instance of O1 available, Opt performs its second iteration to produce the second instance of O2. When the first and second instances of O2 are available (stored into I3), the third tensor operation Op3 606 can generate its first instance of output tensor O3. In FIG. 6 the input 3 and input 4 of Op3 606 represent the buffer of Op3 storing two instances of output tensor O2. The O3 can now be copied to I4" (input 1") an now both operands for Op4 608 are variable and the first iteration of Op4 608 produces the output tensor O4.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

We claim:

1. A system comprising:
   a neural network accelerator comprising a plurality of processing cores and a memory;
   a machine-readable storage medium storing instructions associated with a neural network application;
   a complier to compile the instructions and to generate machine-level executable codes executable by the plurality of processing cores, the machine-level executable codes to:
      perform a plurality of tensor operations, each tensor operation of the plurality of tensor operations to generate an output tensor using a plurality of corresponding input operands;
      select a binary tensor operation from the plurality of tensor operations that receives input operands from a first output tensor of a first tensor operation and a second output tensor of a second tensor operation;
      generate, for the input operands of the binary tensor operation, a count of instances of the first output tensor and a count of instances of the second output tensor; and
      allocate, in the memory of the neural network accelerator, a buffer space for a first input operand of the input operands in the binary tensor operation based on a difference between the count of instances of the first output tensor and the count of instances of the second output tensor.

2. The system of claim 1, wherein the machine-level executable codes are to:
   store each instance of the count of instances of the first output tensor in the allocated buffer space for the first input operand of the binary tensor operation.

3. The system of claim 1, wherein the first output tensor and the second output tensor are received as the input operands at the binary tensor operation from two different paths of a multipath convolutional neural network.

4. The system of claim 1, wherein the machine-level executable codes to:
   allocating a working space for each tensor operation of the plurality of tensor operations, wherein the working space is allocated in a portion of the memory of the neural network accelerator.

5. The system of claim 4, wherein the working space allocated for each tensor operation is within a memory of a tile unit of the neural network-accelerator.

6. The system of claim 1, wherein each tensor operation of the plurality of tensor operations is performed in an allocated processing core of the plurality of processing cores of the neural network accelerator.

7. The system of claim 1, wherein the plurality of tensor operations comprises at least one of a convolution operation, a pooling operation, a padding operation, an addition operation, and a concatenation operation.

8. A method for implementing tensor operations in a neural network accelerator, the method comprising:
   performing, by one or more processing cores of the neural network accelerator, a plurality of tensor operations, each tensor operation of the plurality of tensor operations to generate an output tensor using a plurality of corresponding input operands;
   select a binary tensor operation from the plurality of tensor operations that receives input operands from a first output tensor of a first tensor operation and a second output tensor of a second tensor operation;
   generate, for the input operands of the binary tensor operation, a count of instances of the first output tensor and a count of instances of the second output tensor; and
   allocating, in a memory of the neural network accelerator, a buffer space for each input tensor operand in the binary tensor operation based on the difference between the count of instances of the first output tensor and the count of instances of the second output tensor.

9. The method of claim 8, wherein the first output tensor and the second output tensor are received as input operands at the binary tensor operation from two different paths of a multipath convolutional neural network.

10. The method of claim 8, wherein allocating the buffer space for each input tensor operand in the binary tensor operation based on the difference between the first count of instances and the second count of instances comprises:
allocating the buffer space to store the instances of the first output tensor until a first instance of the second output tensor is available at the binary tensor operation.

11. The method of claim 8, further comprises:
allocating a working space for each tensor operation of the plurality of tensor operations, wherein the working space is allocated in a portion of a memory of the neural network accelerator.

12. The method of claim 11, wherein the working space is allocated for each tensor operation is allocated within a memory of a tile unit of the neural network accelerator.

13. The method of claim 8, wherein the first output tensor and the second output tensor are generated at different rates.

14. The method of claim 8, wherein each tensor operation of the plurality of tensor operations is performed in an allocated processing core of the plurality of cores of the neural network accelerator.

15. The method of claim 8, wherein the plurality of tensor operations comprises at least one of a convolution operation, a pooling operation, a padding operation, an addition operation, and a concatenation operation.

16. A non-transitory computer-readable medium storing instructions for compiling by a compiler to generate machine-level executable codes to:
perform, by one or more processing cores of a neural network accelerator, a plurality of tensor operations, each tensor operation of the plurality of tensor operations generate an output tensor using a plurality of corresponding input operands;
select a binary tensor operation from the plurality of tensor operations that receives tensor operands from a first output tensor of a first tensor operation and a second output tensor of a second tensor operation;
generate, for the input operands of the binary tensor operation, a count of instances of the first output tensor and a count of instances of the second output tensor; and
allocate, in a memory of the neural network accelerator, a buffer space for a first input operand of the input operands in the binary tensor operation based on a difference between the count of instances of the first output tensor and the count of instances of the second output tensor.

17. The non-transitory machine-readable storage medium of claim 16, wherein the machine-level executable codes are to:
store each instance of the first output tensor in the allocated buffer space for the first input operand of the binary tensor operation.

18. The non-transitory machine-readable storage medium of claim 16, wherein the first output tensor and the second output tensor are received as input operands at the binary tensor operation from two different paths of a multipath convolutional neural network.

19. The non-transitory machine-readable storage medium of claim 16, wherein the machine-level executable codes are to:
define a working space for each tensor operation of the plurality of tensor operations, wherein the working space is defined in a portion of the memory of the neural network accelerator.

20. The non-transitory machine-readable storage medium of claim 16, wherein each tensor operation of the plurality of tensor operations is performed in an allocated core of the plurality of processing cores of the neural network accelerator.

* * * * *